(12) United States Patent
Sloterbeek (10) Patent No.: US 11,927,298 B2
(45) Date of Patent: Mar. 12, 2024

(54) REARVIEW ASSEMBLY MOUNTING ELEMENT

(71) Applicant: GENTEX CORPORATION, Zeeland, MI (US)

(72) Inventor: Eric S. Sloterbeek, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/893,520

(22) Filed: Aug. 23, 2022

(65) Prior Publication Data

US 2023/0055544 A1 Feb. 23, 2023

Related U.S. Application Data

(60) Provisional application No. 63/235,965, filed on Aug. 23, 2021.

(51) Int. Cl.
  *F16M 11/14* (2006.01)
  *B60R 1/04* (2006.01)
  *B60R 1/12* (2006.01)

(52) U.S. Cl.
  CPC .............. *F16M 11/14* (2013.01); *B60R 1/04* (2013.01); *B60R 1/12* (2013.01); *B60R 2001/1215* (2013.01)

(58) Field of Classification Search
  CPC .. F16M 11/14; B60R 1/04; B60R 1/12; B60R 2001/1215
  See application file for complete search history.

(56) References Cited

U.S. PATENT DOCUMENTS 5,377,949 A * 1/1995 Haan ...................... F16M 13/02
                                                248/483
6,540,193 B1 * 4/2003 DeLine .................... B60R 1/04
                                                248/483
(Continued)

FOREIGN PATENT DOCUMENTS

| CN | 112918383 A | 6/2021 |
| JP | 2000219083 A | 8/2000 |
| KR | 1020110045122 A | 5/2011 |

OTHER PUBLICATIONS

International Search Report dated Dec. 13, 2022, for corresponding PCT application PCT/US2022/041181, 4 pages.

(Continued)

*Primary Examiner* — Monica E Millner
(74) *Attorney, Agent, or Firm* — Price Heneveld LLP; Brian James Brewer (57) ABSTRACT

A mounting element for a rearview assembly may comprise a mount capable of being removably attachable to a button and having a tapered channel in a first end; a pivot comprising a first end capable of supporting the rearview assembly and a pivot ball; a pivot cup disposed at least partially within the tapered channel of the mount, having fingers extending from a first end and an annular surface having an outer diameter at a second end, the pivot cup being operable to at least partially accept and to exert a pivot torque on the pivot ball; and a coil spring having a first end, a second end, and an outer diameter similar to the diameter of the annular surface of the pivot cup, the coil spring disposed within the mount, the first end of the coil spring pressing against the annular surface of the pivot cup.

16 Claims, 6 Drawing Sheets

(56) References Cited

U.S. PATENT DOCUMENTS

| | | | | |
|---|---|---|---|---|
| 7,784,953 | B2* | 8/2010 | Rumsey | B60R 1/04 359/872 |
| 8,157,238 | B2* | 4/2012 | Lee | B60R 1/04 403/56 |
| 11,173,842 | B2* | 11/2021 | Lundy | B60R 1/04 |
| 11,623,567 | B2* | 4/2023 | Ypma | B60R 1/04 248/476 |
| 2004/0195486 | A1 | 10/2004 | Rumsy et al. | |
| 2006/0138299 | A1 | 6/2006 | Deline | |
| 2007/0096005 | A1* | 5/2007 | March | B60R 1/04 248/549 |
| 2010/0277821 | A1* | 11/2010 | Roth | B60R 1/04 359/872 |

OTHER PUBLICATIONS

Written Opinion dated Dec. 13, 2022, for corresponding PCT application No. PCT/US2022/041181, 5 pages.

* cited by examiner

REARVIEW ASSEMBLY MOUNTING ELEMENT

CROSS REFERENCE TO RELATED APPLICATIONS

This application claims the benefit of and priority to U.S. Provisional Patent Application No. 63/235,965, filed on Aug. 23, 2021, entitled "Rearview Assembly Mounting Element," the entire disclosure of which is hereby incorporated herein by reference.

FIELD OF THE DISCLOSURE

This disclosure relates generally to methods and systems for mounting rearview assemblies to vehicles, and in particular, to methods and systems for mounting rearview assemblies having additional features to vehicles.

BACKGROUND

An increasing number of cameras and sensors are being used for enhanced vehicle safety features, and may be placed on the windshield. Accordingly, less space may be available for rearview assembly mounting systems. In addition, it may be desirable to remove some existing components from the interior of rearview assembly to allow additional features to be included within the rearview assembly.

SUMMARY

According to an aspect, a mounting element for a rearview assembly, may comprise a mount capable of being removably attachable to a button, the mount having a first end defining a tapered channel and a second end; a pivot may comprise a first end configured to support the housing of the rearview assembly, and a pivot ball; a pivot cup disposed at least partially within the tapered channel defined by the first end of the mount, the pivot cup having fingers extending from a first end and a generally flat annular surface having an outer diameter at a second end, the pivot cup being operable to at least partially accept the pivot ball and to exert a pivot torque on the pivot ball; and a coil spring having a first end, a second end, and an outer diameter that may be generally the same as the outer diameter of the generally flat annular surface of the pivot cup, the coil spring disposed within the mount and the first end of the coil spring pressing against the generally flat annular surface of the pivot cup.

The mounting element further may comprise a detach spring disposed at least partially within a cavity defined by the second end of the mount and configured to abut the second end of the coil spring, the detach spring configured to secure the mounting element to a surface of a vehicle. The mounting element further may comprise a cover plate secured to the detach spring. The mounting element further may comprise at least one cover screw, the at least one cover screw configured to secure the cover plate to the mount. The at least one cover screw may be adjustable; and wherein adjusting the at least one cover screw moves the cover plate relative to the mount. Moving the cover plate relative to the mount may move the second end of the coil spring relative to the mount; and moving the second end of the coil spring relative to the mount may move the pivot cup relative to the mount. Moving the pivot cup relative to the mount may change the pressure against the pivot ball exerted by the fingers, thereby changing the pivot torque of the pivot. Tightening or loosening of the at least one cover screw may be operable to change the amount of pivot torque on the pivot ball.

According to another aspect, a rearview assembly may comprise: a housing supporting at least one of a mirror element, a display element, and an electro-optic element; a mount capable of being removably attachable to a button, the mount having a first end defining a tapered channel and a second end; a pivot capable of supporting the housing of the rearview assembly, the pivot may comprise a first end and a pivot ball; a pivot cup disposed at least partially within the tapered channel defined by the first end of the mount, the pivot cup having fingers extending from a first end and a generally flat annular surface having an outer diameter at a second end, the pivot cup being operable to at least partially accept the pivot ball and to exert a pivot torque on the pivot ball; and a coil spring having a first end, a second end, and an outer diameter that may be generally the same as the generally flat annular surface of the pivot cup, the coil spring disposed within the mount and the first end of the coil spring pressing against the generally flat annular surface of the pivot cup.

The rearview assembly further may comprise a detach spring disposed at least partially within a cavity defined by the second end of the mount and configured to abut the second end of the coil spring, the detach spring configured to secure the mounting element to a surface of a vehicle. The rearview assembly further may comprise a cover plate secured to the detach spring; and at least one cover screw, the at least one cover screw configured to secure the cover plate to the mount. The at least one cover screw may be adjustable; and adjusting the at least one cover screw may move the cover plate relative to the mount. Moving the cover plate relative to the mount may move the second end of the coil spring relative to the mount. Moving the second end of the coil spring relative to the mount may move the pivot cup relative to the mount. Moving the pivot cup relative to the mount may change the pressure against the pivot ball exerted by the fingers, thereby changing the pivot torque of the pivot. Tightening or loosening of the at least one cover screw may be operable to change the amount of pivot torque on the pivot ball.

According to an aspect, a method of adjusting pivot torque on a pivot of a rearview assembly may comprise: providing a mounting element for a rearview assembly, the mounting element comprising a mount capable of being removably attachable to a button, the mount having a first end and a second end, the first end defining a tapered channel; a pivot capable of supporting the rearview assembly, comprising a first end and a pivot ball; a pivot cup disposed at least partially within the tapered channel defined by the first end of the mount, the pivot cup having fingers extending from a first end and a generally flat annular surface having an outer diameter at a second end, the pivot cup being operable to at least partially accept the pivot ball and to exert a pivot torque on the pivot ball; a coil spring having a first end, a second end, and an outer diameter that may be generally the same as the generally flat annular surface of the pivot cup, the coil spring disposed within the mount and the first end of the coil spring pressing against the generally flat annular surface of the pivot cup; a detach spring disposed at least partially within a cavity defined by the second end of the mount and configured to abut the second end of the coil spring, the detach spring configured to secure the mounting element to a surface of a vehicle; a cover plate secured to the detach spring; at least one cover screw, the at least one cover screw configured to secure the cover plate to the mount; wherein the at least one cover screw may be adjustable; and adjusting the at least one cover screw.

The method further may comprise moving, in response to the adjust of the cover screw, the cover plate relative to the mount. The method further may comprise moving, in response to the movement of the cover plate, the second end of the coil spring relative to the mount. The method further may comprise moving, in response to the movement of the second end of the coil spring, the pivot cup relative to the mount. The method further may comprise changing, in response to the movement of the pivot cup relative to the mount, the pressure against the pivot ball exerted by the fingers, thereby changing the pivot torque of the pivot.

DETAILED DESCRIPTION

Moving some components used in mounting a rearview assembly to a vehicle, from within a housing of the rearview assembly, may allow for more room within the housing of the rearview assembly for additional features, such as driver monitoring and authentication modules. The removed components may be moved to the mounting element of the rearview assembly, thereby allowing the same functionality, but increasing space within the rearview assembly itself. Due to the increasing numbers of sensors and imagers in rearview assemblies and related to monitoring and safety features in vehicles, streamlining the mounting element of the rearview assembly may be desirable.

Figure 1A:
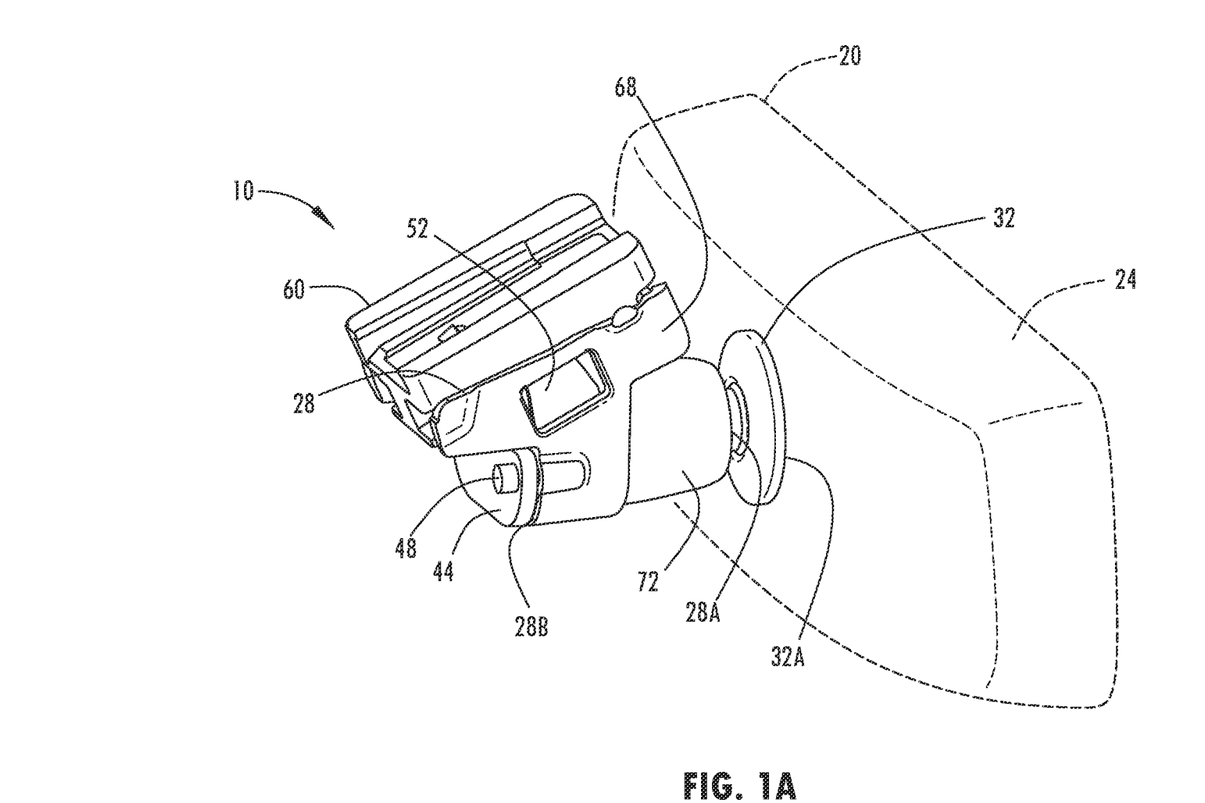
FIG. 1A is a perspective of a first embodiment of a mounting element for a rearview assembly in accordance with this disclosure
Figure 1B:
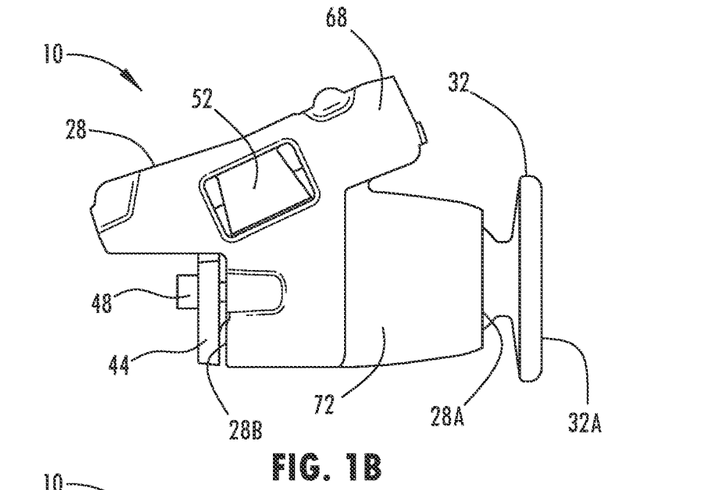
FIG. 1B is a side plan view of the mounting element of FIG. 1A.
Figure 2:
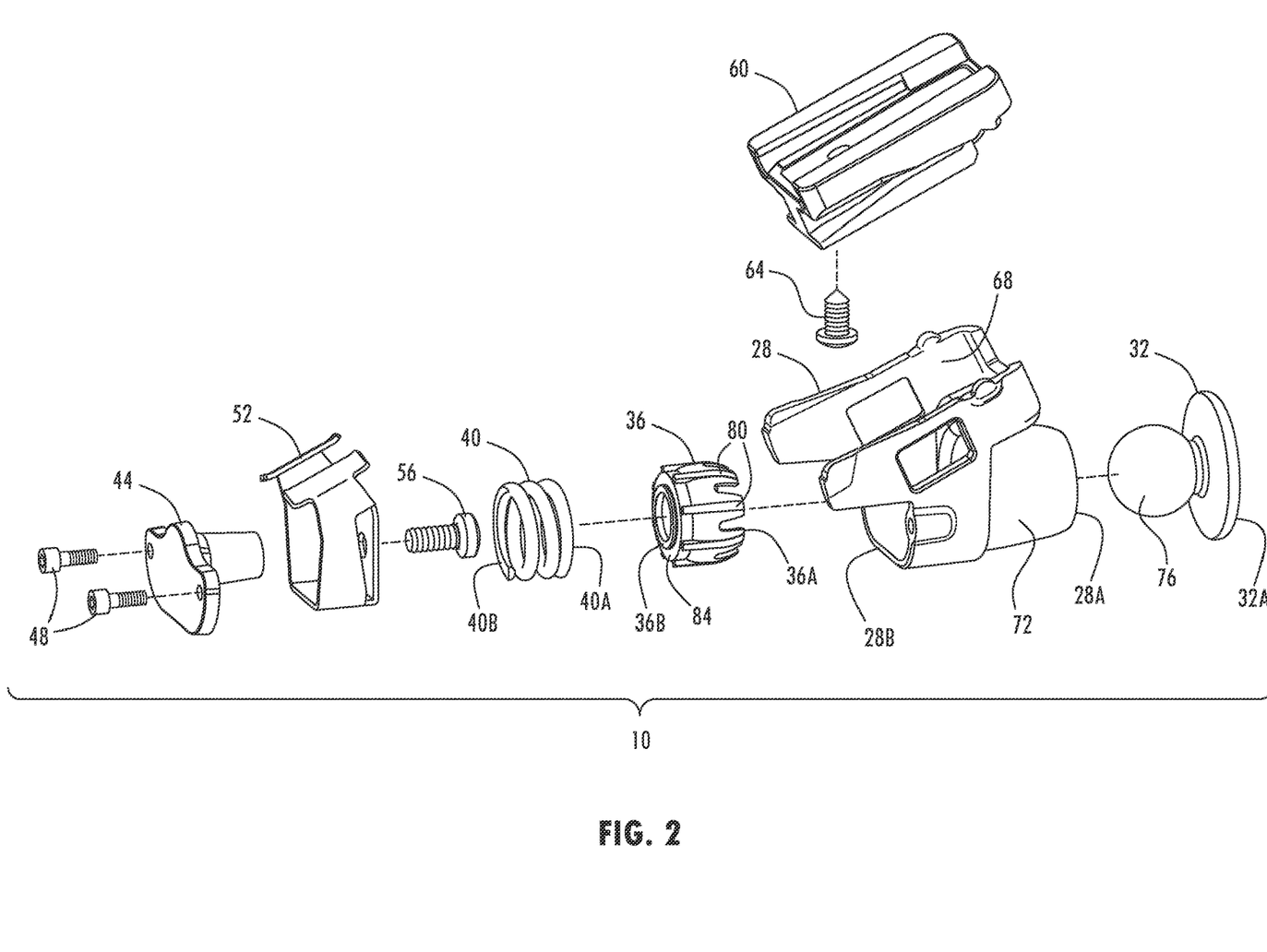
FIG. 2 is an exploded view of the mounting element of FIG. 1A.
Figure 3:
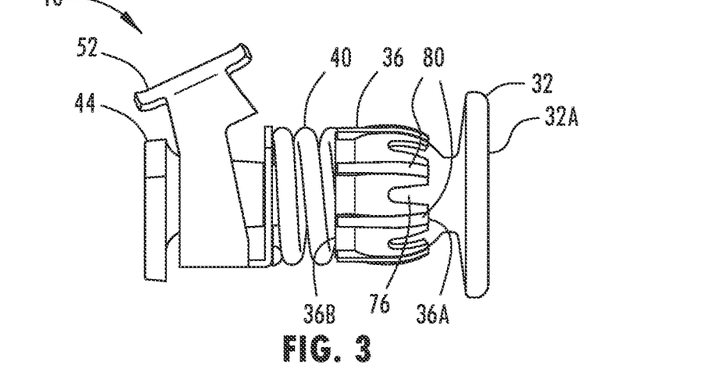
FIG. 3 is a side view of the mounting element of FIG. 1A, with the mount removed.
Figure 4:
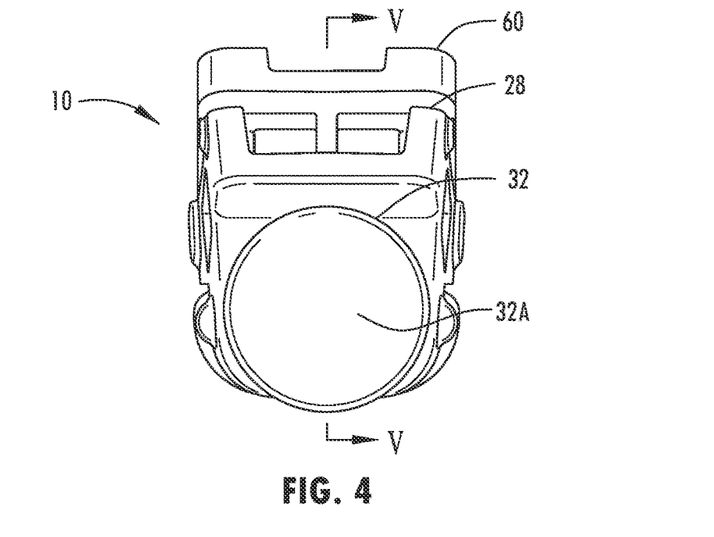
FIG. 4 is a front view of the mounting element of FIG. 1A.
Figure 5:
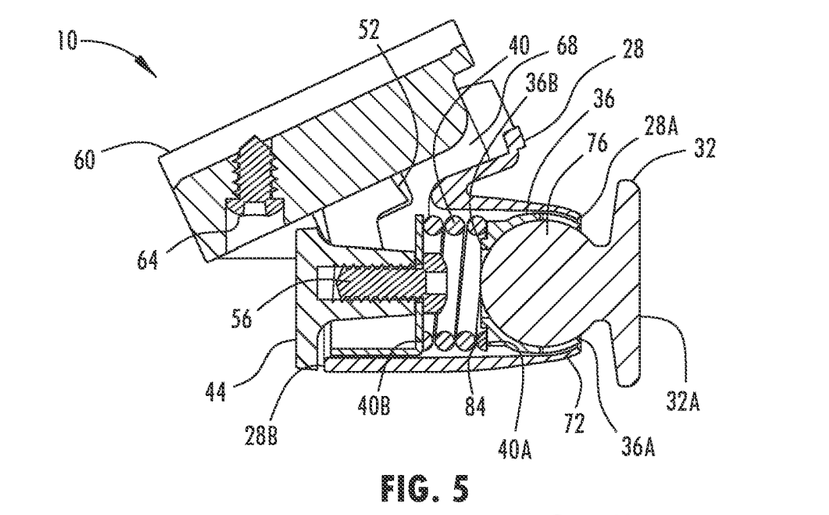
FIG. 5 is a side cross-sectional view of the mounting element of FIG. 4, taken along line V-V.
Figure 6:
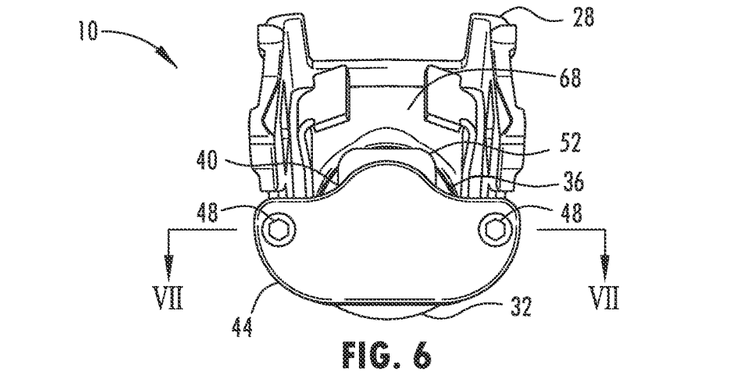
FIG. 6 is a rear view of the mounting element of FIG. 1A.
Figure 7:
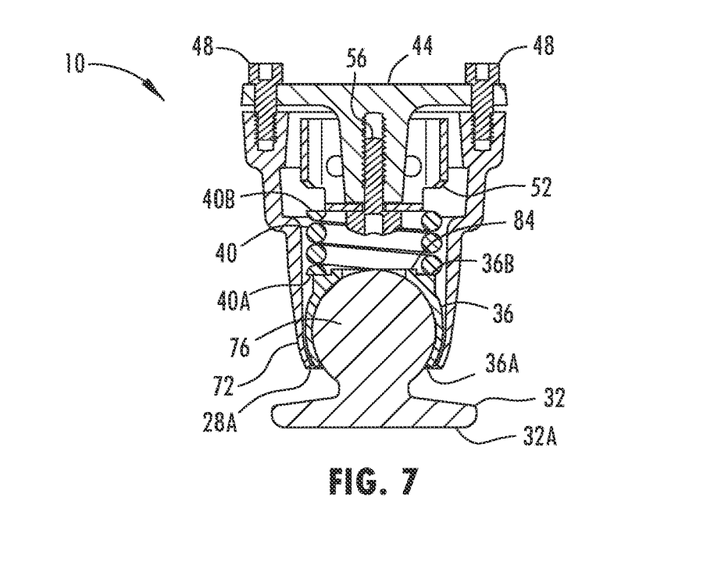
FIG. 7 is a cross-sectional view of the mounting element of FIG. 6, taken along line VII-VII.

Referring to FIGS. 1A and 1B, a mounting element for a rearview assembly is generally shown at reference number 10. Mounting element 10 may be configured to secure housing 24 of a rearview assembly 20 to an interior surface of the vehicle (not shown). As shown in FIG. 2, mounting element 10 may comprise a mount 28, a pivot 32, a pivot cup 36, a pivot coil spring 40, a cover plate 44, and at least one cover screw 48. Mounting element 10 may also comprise a detach spring 52 and a spring screw 56. Mounting element 10 may be configured to be secured to a mounting button 60 which, in turn, may be secured to a vehicle surface, and may be held in place via a button screw 64.

Mount 28 may have a first end 28A, a second end 28B, and a button opening 68, and may be configured to enclose various components of mounting element 10. First end 28A of mount 28 may define a tapered channel 72. Tapered channel 72 may have a generally circular profile. Button opening 68 of mount 28 may be configured to be selectively securable to mounting button 60.

Referring to FIGS. 3-7, pivot 32 may have a first end 32A and a second end that comprises a pivot ball 76. Pivot ball 76 may extend into and be received by first end 28A of mount 28. First end 28A of mount 28 may partially enclose and secure pivot ball 76 in place. First end 32A of pivot 32 may be configured to support housing 24 of rearview assembly 20 and may extend beyond mount 28 when pivot ball 76 is at least partially within tapered channel 72 defined by first end 28A of mount 28.

Pivot cup 36 may be generally cylindrical and may have a first end 36A and a second end 36B. Pivot cup 36 may be disposed at least partially within tapered channel 72 defined by first end 28A of mount 28. Pivot cup 36 may be configured to receive at least a portion of pivot ball 76. Fingers 80 may extend from first end 36A of pivot cup 36 and may partially enclose pivot ball 76. Second end 36B of pivot cup 36 may have a generally flat, annular surface 84 having an outer diameter.

Pivot coil spring 40 may comprise a coil spring and may have an outer diameter, a first end 40A and a second end 40B. The outer diameter of pivot coil spring 40 may be generally the same as the outer diameter of the generally flat, annular surface 84 of second end 36B of pivot cup 36. This may allow mounting element 10 to be relatively small and compact. First end 40A of pivot coil spring 40 may be configured to rest against the generally flat, annular surface 84 of second end 36B of pivot cup 36.

Detach spring 52 may comprise a two-lobed spring, a three-lobed spring, a four-lobed spring, or other styles of springs as known in the art. Detach spring 52 may be configured to secure mount 28 to mounting button 60, thereby securing rearview assembly 20 to a vehicle surface. Detach spring 52 may further be secured to mount 28. Detach spring 52 may be disposed at least partially within a cavity (not shown) defined by second end 28B of mount 28 and may extend toward button opening 68. Spring screw 56 may secure detach spring 52 to cover plate 44.

When in position, detach spring 52 may push against second end 40B of coil spring, compressing coil spring and causing coil spring to push pivot cup 36 away from second end 28B of mount 28 and toward first end 28A of mount 28. Tapered channel 72 at first end 28A of mount 28 may push fingers 80 of pivot cup 36 inward toward the center of tapered channel 72, thereby causing fingers 80 to grip pivot ball 76. In some embodiments, detach spring 52 may be adjustable, capable of moving a distance between first end 28A and second end 28B of mount 28. In some embodiments, cover plate 44 may be forced against coil spring 40. Upon being adjusted, detach spring 52 may be capable of providing varying amounts of force against pivot coil spring 40. As force is applied against pivot coil spring 40, detach spring 52 may further compress coil spring, thereby pushing pivot cup 36 further toward first end 28A of mount 28. As pivot cup 36 moves further toward first end 28A of mount 28, it moves further into tapered channel 72, forcing fingers 80 to move further toward the center of the tapered channel 72, thereby gripping pivot ball 76 more tightly and increasing the friction. This, in turn, may increase the pivot torque of mounting element 10 or the amount of torque required to move pivot ball 76 within pivot cup 36.

Pivot torque of mounting element 10 may be adjusted by adjusting the location of at least one of detach spring 52 and cover plate 44. This adjustment to detach spring 52 may be done by adjusting the distance between cover plate 44 and mount 28. The adjustment may be done via the at least one cover screw 48. Cover plate 44 may be securable to mount 28 by at least one cover screw 48. A gap 88 between cover plate 44 and mount 28 may allow cover plate 44 to be moved toward or away from first end 28A of mount 28, thereby adjusting the distance between cover plate 44 and mount 28 and, accordingly, the amount of torque required to move pivot ball 76 within pivot cup 36. For example, tightening the at least one cover screw 48 may force cover plate 44 closer to first end 28A of mount 28, thereby reducing the size of the gap 88. This, in turn, may force detach spring 52 to press harder against pivot coil spring 40, thereby compressing coil spring. As coil spring is compressed, it may force pivot cup 36 toward first end 32A of pivot 32, and fingers 80 of pivot cup 36 may be directed, by tapered channel 72 of mount 28, along pivot ball 76 toward first end 32A of pivot 32, thereby gripping pivot ball 76 more tightly. Accordingly, more torque may be required to move pivot ball 76 within pivot cup 36.

In another example, loosening the at least one cover screw 48 may allow cover plate 44 to move away from first end 28A of mount 28, increasing the size of the gap and allowing detach spring 52 to move away from first end 28A of mount 28, thereby reducing the force applied against pivot coil spring 40, and allowing pivot coil spring 40 to expand. As pivot coil spring 40 expands, it may reduce the pressure against pivot ball 76, allowing pivot cup 36 to move toward second end 28B of mount 28 as fingers 80 move away from center of tapered channel 72, thereby reducing the pressure against pivot ball 76 and consequently reducing the pivot torque.

Figure 8:
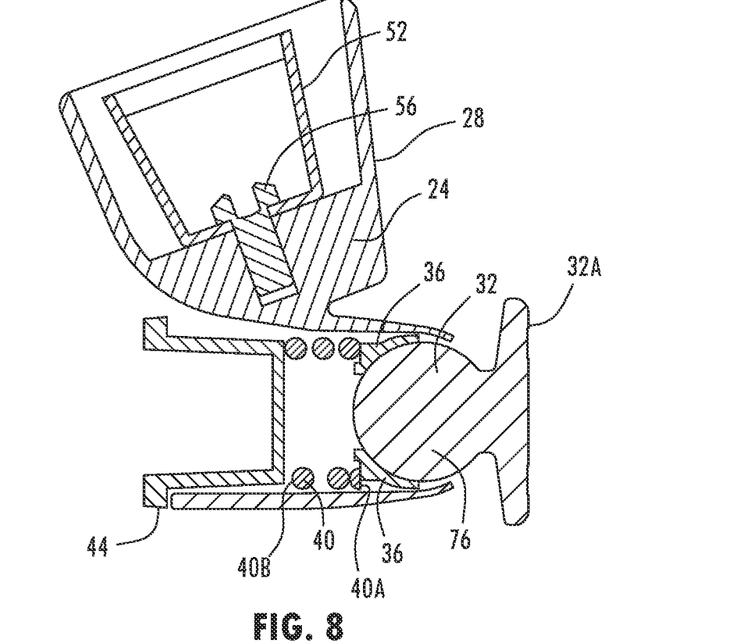
FIG. 8 is a side view of another embodiment of a mounting element for a rearview assembly.

Referring to FIG. 8, in some embodiments, cover plate 44 may press directly against coil spring 40. The adjustment to cover plate 44 may be done by tightening or loosening the cover screws 48, allowing cover plate 44 to compress coil spring 40. As described above, a gap 88 between cover plate 44 and mount 28 may allow cover plate 44 to be moved toward or away from first end 28A of mount 28, thereby adjusting the distance between cover plate 44 and mount 28 and, accordingly, the amount of torque required to move pivot ball 76 within pivot cup 36. For example, tightening the at least one cover screw 48 may force cover plate 44 closer to first end 28A of mount 28, thereby reducing the size of the gap 88. This, in turn, may force detach spring 52 to press harder against pivot coil spring 40, thereby compressing coil spring. As coil spring is compressed, it may force pivot cup 36 toward first end 32A of pivot 32, and fingers 80 of pivot cup 36 may be directed, by tapered channel 72 of mount 28, along pivot ball 76 toward first end 32A of pivot 32, thereby gripping pivot ball 76 more tightly. Accordingly, more torque may be required to move pivot ball 76 within pivot cup 36. In another example, loosening the at least one cover screw 48 may allow cover plate 44 to move away from first end 28A of mount 28, increasing the size of the gap and allowing detach spring 52 to move away from first end 28A of mount 28, thereby reducing the force applied against pivot coil spring 40, and allowing pivot coil spring 40 to expand. As pivot coil spring 40 expands, it may reduce the pressure against pivot ball 76, allowing pivot cup 36 to move toward second end 28B of mount 28 as fingers 80 move away from center of tapered channel 72, thereby reducing the pressure against pivot ball 76 and consequently reducing the pivot torque.

As used herein, a "rearview assembly" is a structure that may provide an image of a scene to the rear of a driver. Rearview assembly 20 may include a mirror element such as a prismatic mirror. Rearview assembly 20 may include an electro-optic rearview element. Rearview assembly 20 may additionally or alternatively include a display element that displays an image as sensed by a rearward facing camera or other imaging system (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Additionally or alternatively, rearview assembly 20 may include both an electro-optic rearview element and a display element for providing an image from a rearward facing camera or other imaging system. Thus, a "rearview assembly" need not include a mirror element. In general, rearview assemblies include housing 24 that may have a wide variety of possible designs, such as, for example, the mirror housing taught and claimed in U.S. Pat. No. 5,448,397. Rearview assemblies may also include at least one of a mirror element, electro-optic element, and display element (not shown), mounted in housing 24, and a mounting element 10 configured to attach housing 24 to the vehicle.

Figure 10:
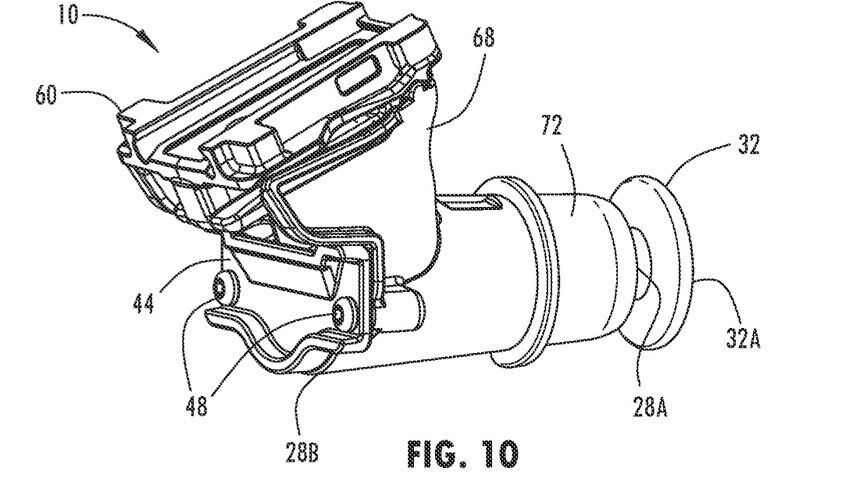
FIG. 10 is a perspective view of a second embodiment of a mounting element for a rearview assembly in accordance with this disclosure.
Figure 11:
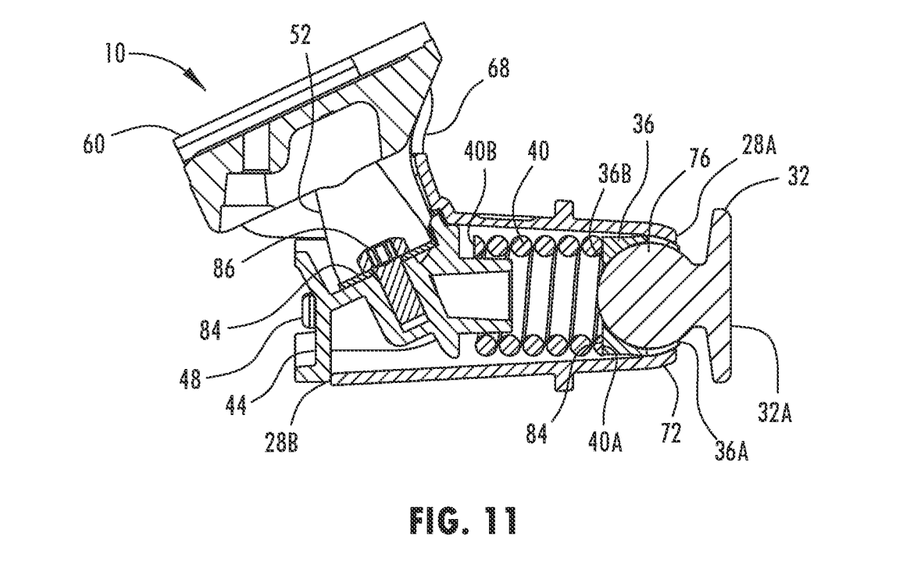
FIG. 11 is a side cross-sectional view of the second embodiment of the mounting element of FIG. 10.

In some embodiments, as shown in FIGS. 10 and 11, detach spring 52 may be secured to cover plate 44. Coil spring 40 may rest against cover plate 44. Spring screw 86 may secure detach spring to cover plate 44. A portion of cover plate 44 may rest against a landing zone of mount 28, thereby securing cover plate 44 into proper position.

Figure 9:
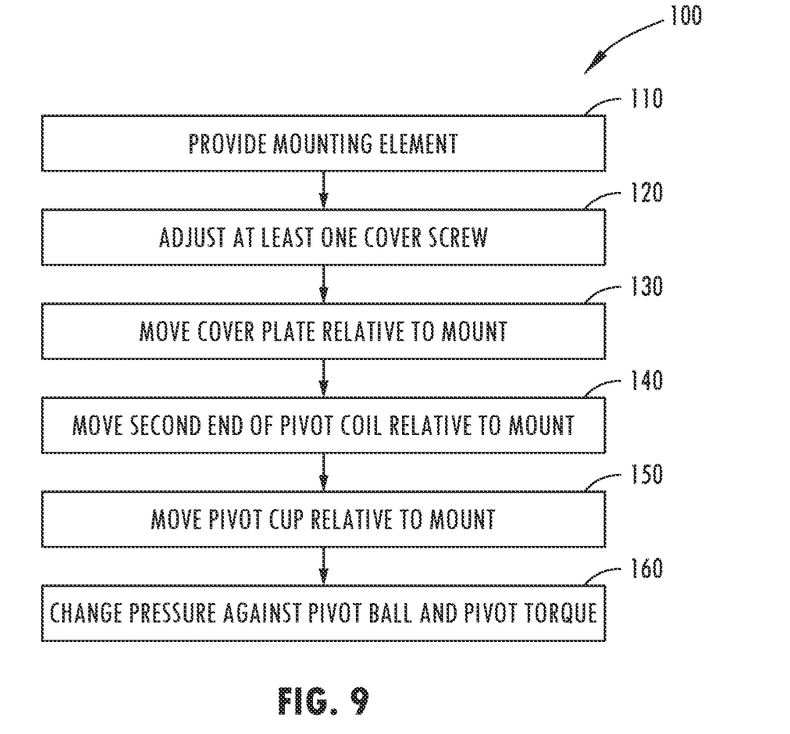
FIG. 9 is a flow chart illustrating a method of changing the pivot torque of a pivot on a rearview assembly.

As shown in FIG. 9, a method 100 of adjusting pivot torque on a pivot 32 of a rearview assembly 20 may comprise, in step 110, providing a mounting element 10 as described above. In step 120, the at least one cover screw 48 may be adjusted. In step 130, cover plate 44 may be moved relative to mount 28 in response to the adjustment of cover screw 48. In step 140, and in response to the movement of cover plate 44, second end 40B of pivot coil spring 40 relative to mount 28 may move in the same direction as cover plate 44. In step 150, and in response to the movement of second end 40B of pivot coil spring, pivot cup 36 may move relative to mount 28 and in the same direction as cover plate 44. In step 160, and in response to the movement of pivot cup 36 relative to mount 28, the pressure against pivot ball 76 exerted by fingers 80 may change, thereby changing the pivot torque of pivot 32.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A mounting element for a rearview assembly, comprising:
   a mount removably attachable to a button, the mount having a first end and a second end, the first end defining a tapered channel;
   a pivot comprising a first end and a pivot ball, the first end being configured to support a housing of the rearview assembly;
   a pivot cup disposed at least partially within the tapered channel of the first end of the mount, the pivot cup having fingers extending from a first end and a generally flat annular surface having an outer diameter at a second end, the pivot cup being operable to at least partially accept the pivot ball and to exert a pivot torque on the pivot ball;
   a coil spring having a first end, a second end, and an outer diameter that is generally the same as the outer diameter of the generally flat annular surface of the pivot cup, the coil spring disposed within the mount and the first end of the coil spring pressing against the generally flat annular surface of the pivot cup; and
   a detach spring disposed at least partially within a cavity defined by the second end of the mount and configured to abut the second end of the coil spring, the detach spring configured to secure the mounting element to a surface of a vehicle.

2. The mounting element of claim 1, further comprising a cover plate secured to the detach spring.

3. The mounting element of claim 2, further comprising at least one cover screw, the at least one cover screw configured to secure the cover plate to the mount.

4. The mounting element of claim 3, wherein the at least one cover screw is adjustable; and
   wherein adjusting the at least one cover screw moves the cover plate relative to the mount.

5. The mounting element of claim 4, wherein the mounting element is configured so that moving the cover plate relative to the mount moves the second end of the coil spring relative to the mount and moving the second end of the coil spring relative to the mount moves the pivot cup relative to the mount.

6. The mounting element of claim 5, wherein moving the pivot cup relative to the mount changes the pressure against the pivot ball exerted by the fingers, thereby changing the pivot torque of the pivot.

7. The mounting assembly of claim 3, wherein tightening or loosening of the at least one cover screw is operable to change the amount of pivot torque on the pivot ball.

8. A rearview assembly, comprising:
   a housing supporting at least one of a mirror element, a display element, and an electro-optic element;

a mount removably attachable to a button, the mount having a first end defining a tapered channel and a second end;

a pivot capable of supporting the housing of the rearview assembly, the pivot comprising a first end and a pivot ball;

a pivot cup disposed at least partially within the tapered channel defined by the first end of the mount, the pivot cup having fingers extending from a first end and a generally flat annular surface having an outer diameter at a second end, the pivot cup being operable to at least partially accept the pivot ball and to exert a pivot torque on the pivot ball; and a coil spring having a first end, a second end, and an outer diameter that is generally the same as the generally flat annular surface of the pivot cup, the coil spring disposed within the mount and the first end of the coil spring pressing against the generally flat annular surface of the pivot cup; and a detach spring disposed at least partially within a cavity defined by the second end of the mount and configured to abut the second end of the coil spring, the detach spring configured to secure the mounting element to a surface of a vehicle.

9. The rearview assembly of claim 8, further comprising a cover plate secured to the detach spring; and at least one cover screw, the at least one cover screw configured to secure the cover plate to the mount;

wherein the at least one cover screw is adjustable; and wherein adjusting the at least one cover screw moves the cover plate relative to the mount.

10. The rearview assembly of claim 9, wherein moving the cover plate relative to the mount moves the second end of the coil spring relative to the mount;

wherein moving the second end of the coil spring relative to the mount moves the pivot cup relative to the mount; and wherein moving the pivot cup relative to the mount changes the pressure against the pivot ball exerted by the fingers, thereby changing the pivot torque of the pivot.

11. The rearview assembly of claim 9, wherein tightening or loosening of the at least one cover screw is operable to change the amount of pivot torque on the pivot ball.

12. A method of adjusting pivot torque on a pivot of a rearview assembly, comprising:

providing a mounting element for a rearview assembly, the mounting element comprising:

a mount removably attachable to a button, the mount having a first end defining a tapered channel and a second end;

a pivot capable of supporting the rearview assembly, comprising a first end and a pivot ball;

a pivot cup disposed at least partially within the tapered channel defined by the first end of the mount, the pivot cup having fingers extending from a first end and a generally flat annular surface having an outer diameter at a second end, the pivot cup being operable to at least partially accept the pivot ball and to exert a pivot torque on the pivot ball;

a coil spring having a first end, a second end, and an outer diameter that is generally the same as the generally flat annular surface of the pivot cup, the coil spring disposed within the mount and the first end of the coil spring pressing against the generally flat annular surface of the pivot cup;

a detach spring disposed at least partially within a cavity defined by the second end of the mount and configured to abut the second end of the coil spring, the detach spring configured to secure the mounting element to a surface of a vehicle;

a cover plate secured to the detach spring;

at least one cover screw, the at least one cover screw configured to secure the cover plate to the mount; and wherein the at least one cover screw may be adjustable; and adjusting the at least one cover screw.

13. The method of claim 12, further comprising moving, in response to the adjust of the cover screw, the cover plate relative to the mount.

14. The method of claim 13, further comprising moving, in response to the movement of the cover plate, the second end of the coil spring relative to the mount.

15. The method of claim 14, further comprising moving, in response to the movement of the second end of the coil spring, the pivot cup relative to the mount.

16. The method of claim 15, further comprising changing, in response to the movement of the pivot cup relative to the mount, the pressure against the pivot ball exerted by the fingers, thereby changing the pivot torque of the pivot.

* * * * *